US007882382B2

(12) United States Patent
Aksamit et al.

(10) Patent No.: US 7,882,382 B2
(45) Date of Patent: Feb. 1, 2011

(54) SYSTEM AND METHOD FOR PERFORMING COMPUTER SYSTEM MAINTENANCE AND SERVICE

(75) Inventors: Slavek Peter Aksamit, Durham, NC (US); Cristian Medina, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 11/424,038

(22) Filed: Jun. 14, 2006

(65) Prior Publication Data

US 2008/0010471 A1    Jan. 10, 2008

(51) Int. Cl.
*G06F 1/00* (2006.01)

(52) U.S. Cl. .................. 713/324; 713/300; 710/301; 710/302

(58) Field of Classification Search ................ 713/300, 713/324; 710/301, 302
See application file for complete search history.

(56) References Cited

U.S. PATENT DOCUMENTS

| | | | | |
|---|---|---|---|---|
| 3,672,497 | A * | 6/1972 | Lambert | 209/611 |
| 3,879,618 | A | 4/1975 | Larson | |
| 5,409,239 | A | 4/1995 | Tremel | |
| 5,539,391 | A * | 7/1996 | Yuen | 340/825.72 |
| 5,553,296 | A * | 9/1996 | Forrest et al. | 713/323 |
| 5,632,679 | A | 5/1997 | Tremel | |
| 5,796,355 | A | 8/1998 | Smigelski | |
| 5,918,059 | A * | 6/1999 | Tavallaei et al. | 713/300 |
| 6,070,207 | A * | 5/2000 | Bell | 710/302 |
| 6,115,824 | A * | 9/2000 | Ha | 713/330 |
| 6,122,746 | A * | 9/2000 | Nouri et al. | 713/310 |
| 6,232,676 | B1 * | 5/2001 | Kozyra et al. | 307/113 |
| 6,241,527 | B1 | 6/2001 | Rast | |
| 6,286,066 | B1 * | 9/2001 | Hayes et al. | 710/302 |
| 6,307,482 | B1 | 10/2001 | Le Bel | |
| 6,369,466 | B1 * | 4/2002 | Murphy | 307/125 |
| 6,424,844 | B1 * | 7/2002 | Lundqvist | 455/566 |
| 6,622,192 | B2 * | 9/2003 | Chou et al. | 710/260 |
| 6,711,645 | B1 * | 3/2004 | Chari et al. | 710/302 |
| 6,901,273 | B2 * | 5/2005 | Lutnaes | 455/566 |
| 6,990,545 | B2 * | 1/2006 | Arimilli et al. | 710/302 |
| 7,005,997 | B1 * | 2/2006 | Wiewiura | 340/679 |
| 7,024,507 | B2 * | 4/2006 | Inui et al. | 710/300 |
| 7,146,447 | B2 * | 12/2006 | Chari et al. | 710/302 |
| 7,164,935 | B2 * | 1/2007 | Naka et al. | 455/565 |
| 7,200,694 | B2 * | 4/2007 | Yakovlev et al. | 710/48 |
| 7,239,522 | B2 * | 7/2007 | Rust et al. | 361/732 |

(Continued)

*Primary Examiner*—Thomas Lee
*Assistant Examiner*—Jaweed A Abbaszadeh
(74) *Attorney, Agent, or Firm*—Cynthia G. Seal; Jeffrey L. Streets

(57) ABSTRACT

Systems and methods for maintaining and servicing a data processing system or "computer system," including rack enclosures housing multiple servers, desktop computers, and controllers for industrial automation. According to one aspect, touch-activated circuitry is configured with a computer system to control power and data flow to a component port and facilitate hot-swapping of components, such as PCI cards, fans, and hard drives. The component port, such as a PCI slot, electronically interfaces with a removable electronic component, such as a PCI card. A user activates the touch-activated circuitry by touching one or more contact points. Touching the contact points thereby initiate a shut-down sequence of a component driver or other software and then powers down the electronic port so that the electronic component may be safely removed.

12 Claims, 4 Drawing Sheets

U.S. PATENT DOCUMENTS

| | | | |
|---|---|---|---|
| 7,259,683 B2 * | 8/2007 | Abe | 340/635 |
| 7,321,947 B2 * | 1/2008 | Gupta et al. | 710/302 |
| 7,685,443 B2 * | 3/2010 | Chheda et al. | 713/320 |
| 2003/0093602 A1 * | 5/2003 | Chou et al. | 710/260 |
| 2004/0015629 A1 * | 1/2004 | Inui et al. | 710/300 |
| 2004/0199696 A1 * | 10/2004 | Chari et al. | 710/302 |
| 2004/0215865 A1 * | 10/2004 | Arimilli et al. | 710/302 |
| 2004/0243725 A1 * | 12/2004 | Yakovlev et al. | 710/1 |
| 2005/0081074 A1 * | 4/2005 | Chheda et al. | 713/320 |
| 2005/0157479 A1 * | 7/2005 | Hayden | 361/788 |
| 2006/0069835 A1 * | 3/2006 | Arackal et al. | 710/302 |
| 2006/0076927 A1 * | 4/2006 | Nottingham et al. | 320/114 |
| 2006/0206648 A1 * | 9/2006 | Gupta et al. | 710/302 |
| 2007/0182425 A1 * | 8/2007 | Byerley et al. | 324/700 |
| 2008/0051101 A1 * | 2/2008 | Ha et al. | 455/456.1 |
| 2009/0043407 A1 * | 2/2009 | Mathiesen et al. | 700/48 |

* cited by examiner

US 7,882,382 B2

SYSTEM AND METHOD FOR PERFORMING COMPUTER SYSTEM MAINTENANCE AND SERVICE

BACKGROUND OF THE INVENTION

1. Field of the Invention

The invention relates generally to systems and methods for performing computer system maintenance and service.

2. Description of the Related Art

Computer systems, such as desktop computers and rack mounted server systems, require periodic maintenance and servicing. Electronic components are typically mounted on a chassis of a computer system, in such a manner that they can be removed for inspection, repair, or replacement, as necessary. Many electronic components, such as PCI cards, fans, and hard drives, may be "hot swapped," meaning they can be removed without powering down the entire system. Hot swapping a component typically requires first closing any software driver, "removing" the electronic component from the system's operating system software, and cutting off power to the component.

Despite the reliable and increased ease of servicing aspects of modern computer systems, several areas for improvement remain. For example, the number of manual steps required to swap out an electronic component can be time consuming, especially when aggregating the time required to swap out or repair and replace multiple components. Furthermore, computer systems typically incorporate mechanical switches for turning off power to a component prior to removal. Mechanical switches are inherently subject to wear and tear and need periodic replacement. Such repairs contribute to downtime, and increase the expense of servicing and maintaining computer systems.

An improved system and method for servicing and maintaining a computer system are sought. It would be desirable, for example, to reduce the amount of time and labor required to swap out or repair and replace a component. It would also be desirable to reduce the mechanical wear and tear involved.

SUMMARY OF THE INVENTION

According to at least one embodiment, a system includes a computer chassis having a component port removable receiving an electronic component and a touch-activated circuit configured for controlling electrical power to the component port.

According to another embodiment, a system includes a computer chassis having a plurality of component ports, wherein each component port removably receives a electronic component. The system further includes a touch-activated circuit having a plurality of contact points. At least one of the plurality of contact points is uniquely associated with a respective one of the plurality of component ports. Optionally, a shared contact point may also be associated with the plurality of component ports. The touch-activated circuit is configured for detecting a change in value of an electronic parameter attributable to user simultaneously touching the shared contact point and a selected contact point uniquely associated with a respective component port, thereby controlling the supply of electrical power to the respective component port.

According to yet another embodiment, a method for use with a computer system includes sensing an electronic parameter of a circuit including a plurality of contact points on the computer system, wherein the circuit is uniquely associated with an electronic component of the computer system. The circuit detects a change in value of the electronic parameter attributable to a user simultaneously touching the plurality of contact points. The circuit controls the supply of electrical power to the electronic component in response to the detected change in value of the electronic parameter.

DETAILED DESCRIPTION OF PREFERRED EMBODIMENTS

Systems and methods are disclosed for maintaining and servicing a data processing system generally referred to herein as a "computer system." Examples of relevant computer systems include rack enclosures housing multiple servers, desktop computers, and controllers for industrial automation. Some embodiments of the invention are particularly suitable for hot-swapping components, such as PCI cards, fans, and hard drives. The data processing systems discussed below are exemplary, and are not intended to limit the type of data processing system to which the invention applies.

According to one aspect, touch-activated circuitry is configured with a computer system to control and data flow to a component port. The component port electronically interfaces with a removable electronic component. A PCI slot, for example, is one type of electronic port, which interfaces with an electronic component known as a PCI card. The computer system may communicate with PCI card via the PCI slot, along electronic pathways that extend from a CPU, along a circuit board, to terminals on the PCI slot, and to mating terminals on the PCI card. In one embodiment, a user activates the touch-activated circuitry by touching one or more contact points, most conveniently with his or her fingertips. Touching the contact points thereby powers down the electronic port so that the electronic component may be safely removed. Touching the contact points may also initiate a shut-down sequence of a component driver or other software prior to power shut-off.

Accordingly, the reliability and efficiency of maintaining and servicing computer system is improved. Touch-activated circuitry decreases mechanical wear associated with repetitive use of conventional mechanical switches and devices. Related software processes may be automated. Electronic components may be hot swapped, to minimize downtime. Further features and advantages can result, as will be appreciated by those skilled in the art.

Figure 1:
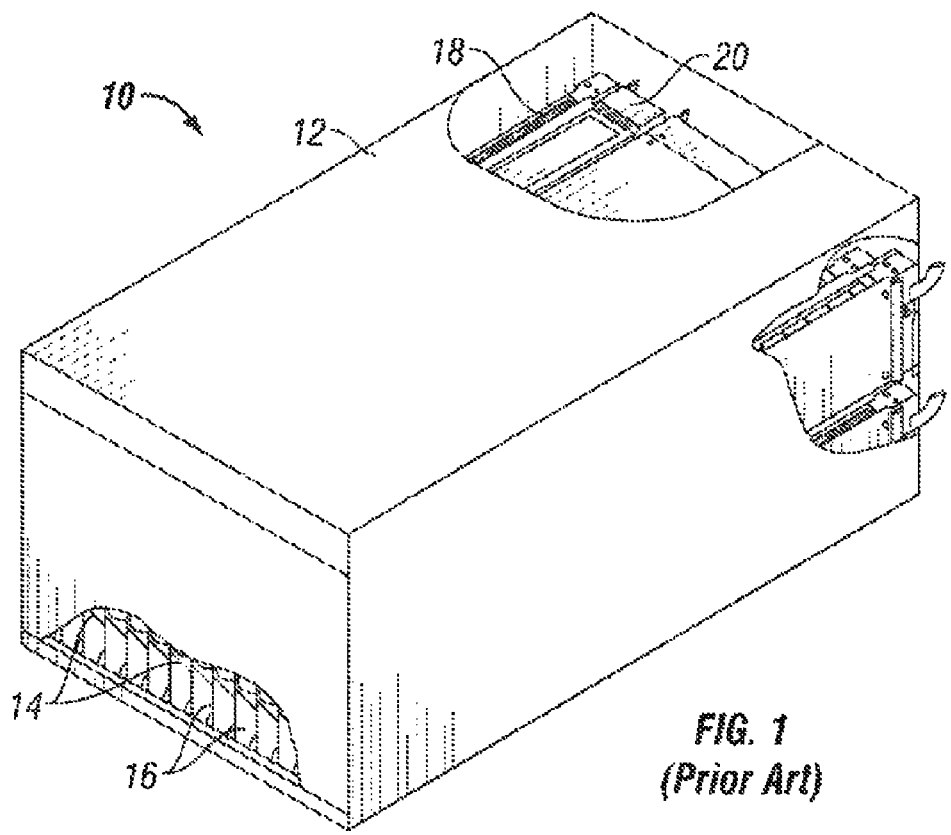
FIG. 1 is a perspective view of a prior art rack-mounted server system.

Turning now to the drawings, FIG. 1 is a perspective view of a prior art rack-mounted server system ("rack system"), generally indicated at 10. Rack system 10 includes an enclosure 12, a plurality of servers 14, vents 16, a management controller module 18, and a power module 20. Rack system 10 may couple servers 14 to an Ethernet network. Each server 14 will typically require periodic maintenance, including the removal or hot-swapping of an electronic component included with each server 14. Alternatively, viewing the rack system 10 as a whole, an individual with server 14 may be a hot-swappable electronic component of the rack system 10, and maintenance of the rack system 10 will typically require the occasional removal or swapping of a server 14. Rack system 10 and its individual servers 14 are, therefore, examples of data processing system that may benefit according to the invention.

Figure 2:
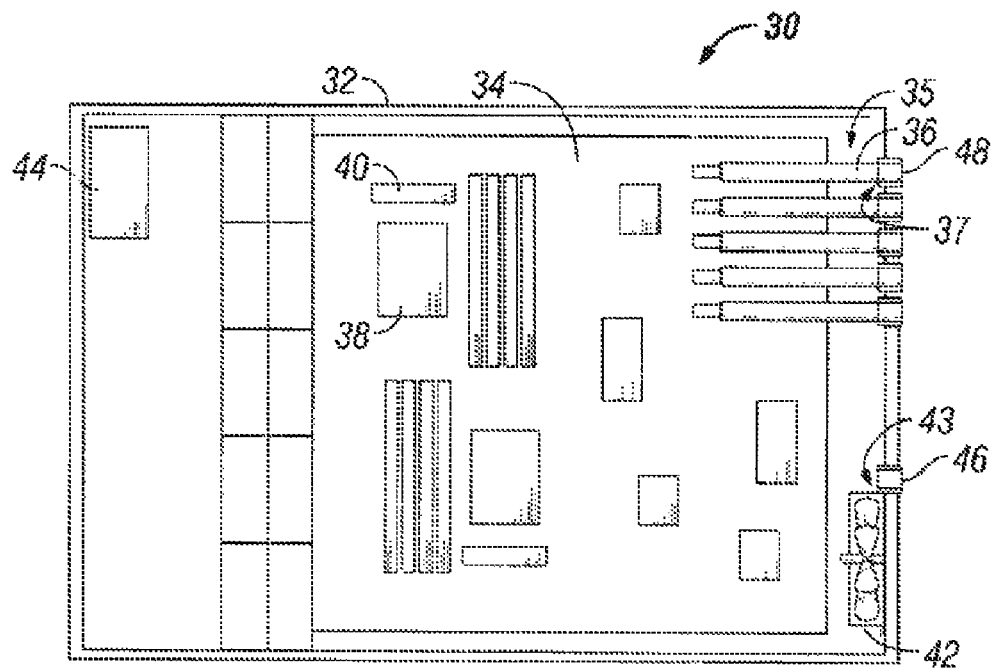
FIG. 2 is a partial schematic view of a computer system that may be maintained and serviced using touch-activated circuitry.

FIG. 2 is a partial schematic view of a computer, generally indicated at 30, that may be maintained and serviced using touch-activated circuitry. Computer 30 may be an individual server included with a rack server system of the type shown in FIG. 1 or an individual computer that operates alone or as part of a network. Computer 30 includes a chassis 32 supporting a circuit board 34. Chassis 32 may be defined to include circuit board 34, in that electronic components may be secured at locations on either or both of the chassis 32 and the circuit board 34. A number of electronic components are secured to chassis 32, such as multiple PCI cards generally indicated at 35, processor chip 38, transducer 40, fan 42, and so forth. Each electronic component interfaces with a respective component port. For example, PCI card 36 electronically interfaces with a PCI slot 37 on chassis 32. Likewise, fan 42 electronically interfaces with fan port 43. Each electronic component has terminals that mate with terminals on its respective component port. Each electronic component may thereby communicate electronically, via its respective component port, with other parts of the computer 30, such as processor chip 38, for example along electronic pathways of circuit board 34. Such communication may include transmission of electrical power, such as power to PCI slot 37, transmission of electronic data, such as digital information passed between PCI card 36 and processor chip 38, or transmission of both electrical power and electronic data.

Still referring to FIG. 2, a number of touch-sensitive contact points are included with computer 30, as elements of touch-activated circuitry discussed further below. The touch-activated circuitry is configured for detecting a change in value of an electronic parameter, such as a drop in electronic resistance of an open circuit attributable to a user touching the contact points. One or two of these contact points are uniquely associated with a particular component port. For example, contact points 48 is uniquely associated with PCI slot 37. Likewise, contact point 46 is uniquely associated with fan port 43. In one embodiment, at least one contact point may be shared by multiple components. For example, a shared contact point 44 is associated with computer 30 generally, and may be operably configured with PCI slot 37, fan port 42, and other component ports of computer 30 to produce a component-specific signal when the shared contact point and a component-specific contact point are touched simultaneously. In an alternative embodiment, each component may have its own pair of dedicated contact points, rather than rely upon a shared contact point.

Still referring to FIG. 2, is one embodiment, the user indicates an invention to perform an operation on computer 30 by touching shared contact point 44. The user then further indicates the invention to perform an operation on a specific electronic component of computer 30 by touching the contact point uniquely associated with that specific electronic component. For example, to hot swap PCI card 36 of computer 30, the user touches both shared contact point 44 and contact point 48. In this embodiment, touching either contact point 48 or shared contact point 44, alone, does not affect operation of PCI card 36. However, touching both contact points 44 and 48, simultaneously, triggers a sequence of operations on the computer 30. For example, the computer 30 may first finish or abort any tasks currently assigned to PCI card 36. The computer 30 may then electronically remove PCI card 36 from its operating system. The operating system may interface with a human user, who approves such changes using a keyboard or other peripheral input device in response to a prompt by the operating system. Finally, the computer 30 may turn off power to PCI slot 37, so that the user may safely remove the PCI card 36 from the PCI slot 37. Alternatively, to remove the fan 42, the user may touch shared contact point 44, and simultaneously touch the contact point 46 uniquely associated with fan 42. Touching contact points 44 and 46 simultaneously may signal the computer 30 to shut off power to fan port 43, so that the user may safely remove fan 42 from the chassis 32.

Figure 3:
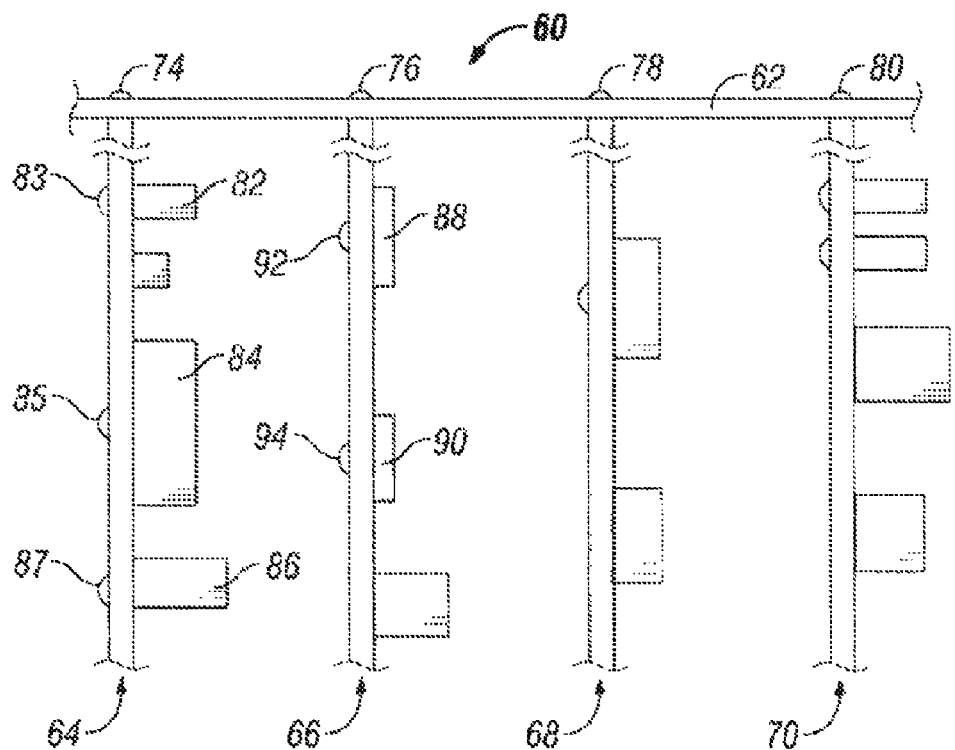
FIG. 3 is an embodiment of a computer system having an array of servers that may be serviced with touch-activated circuitry.

FIG. 3 is an embodiment of a computer system 60 having an array of servers that may be serviced with touch-activated circuitry. An array of servers 64, 66, 68, and 70 are secured to enclosure or chassis 62 and include corresponding shared contact points 74, 76, 78, and 80. Each server has a number of electronic components with corresponding dedicated contact points. For example, server 64 includes removable electronic components 82, 84, and 86, which are uniquely associated with contact points 83, 85, and 87, respectively. Likewise server 66 includes removable electronic components 88 and 90, which are uniquely associated with contact points 92 and 94, respectively.

When a user wants to service component 84, for example, he or she touches shared contact point 74 to indicate the intention to operate on server 64. The user also touches contact point 85 and completes a circuit that is uniquely associated with electronic component 84. By so doing, the touch-activated circuitry of the computer system 60 sets forth a series of predefined operations. For example, the computer system 60 may first complete or abort any tasks being performed by the electronic component 84. Next, the computer system 60 may uninstall the electronic component 84 from the operating system, possibly with input and confirmation by the user. Finally, the computer system 60 may shut off power to the electronic component 84. Optionally, the computer system may provide an audible or visible signal confirming that the system is ready for removal of the electronic component.

Figure 4:
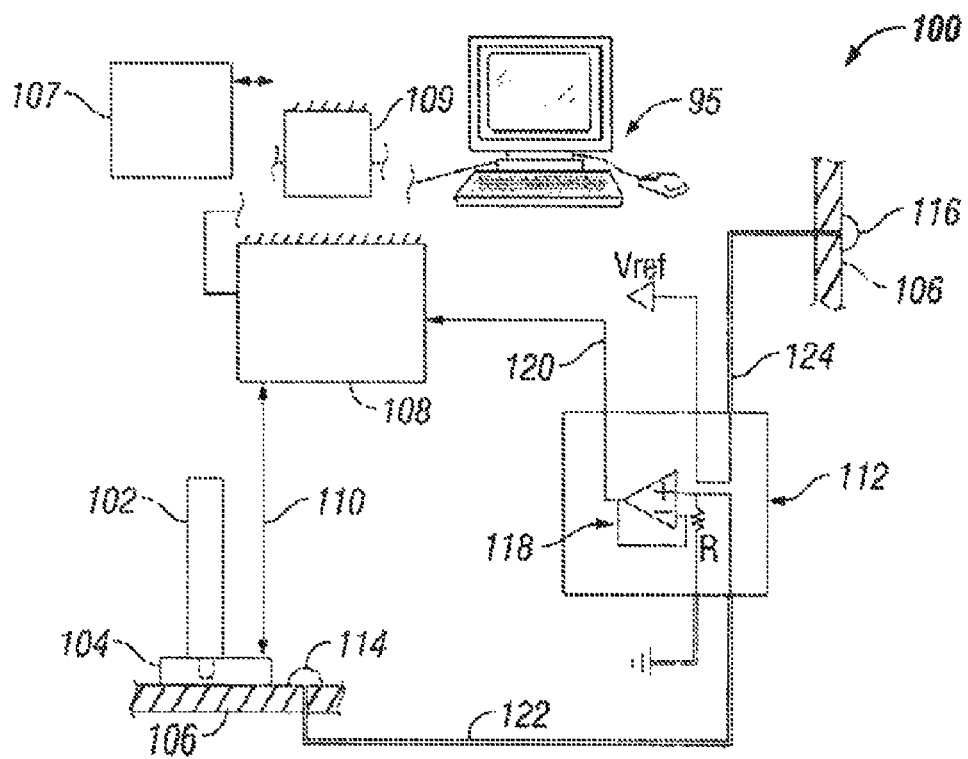
FIG. 4 is a schematic diagram of a computer system having touch-activated circuitry according to an embodiment of the invention.

FIG. 4 is a schematic diagram of a computer system generally indicated at 100, having touch-activated circuitry according to an embodiment of the invention. An electronic component 102 is plugged into a component port 104 that is disposed on a chassis 106 of computer system 100. The computer system 100 includes a port controller, which in this embodiment is a hot plug controller 108. Hot plug controller 108 is in communication with component port 104 along path 110, such that hot plug controller 108 may control, for example, power and data transmission to component port 108. Hot plug controller 108 may also cooperate with other elements of computer system 100, including a processor 109 and software such as an operating system 107. A first contact point 114 is disposed on the chassis 106 adjacent to component port 104, and is dedicated to component 104 in this embodiment. A second contact point 116 is disposed on the chassis 106, and is spaced from contact point 114. Contact point 116 may be "shared" by component port 104, as well as other component ports (not shown).

Still referring to FIG. 4, the sensor circuit 112 includes a first input lead 122 from contact point 114, a second input lead 124 from contact point 116, an amplifier generally indicated at 118, and an output lead 120. When contact points 114 and 116 are not being touched simultaneously, the sensor circuit 112 is "open," and no voltage is reading amplifier 118. Thus, an output signal at output lead 120 is low (e.g., 0V) when contact points 114 and 116 are not being touched simultaneously. However, when contact points 114 and 116 are touched simultaneously, a small amount of current is allowed to flow, and the amplifier 118 will output a high signal (e.g., 2.5V). The reference voltage (Vref) can be a low voltage, and the value for the resistor (R) may vary, but the net result is that the voltage at the non-inverting input (+) to the amplifier 118 would be substantially equal to R/(R+(resistance across contact points 114 and 116)). Hot plug controller 108, typically in cooperation with operating system 107, processor 109, and other elements of computer system 100, may then control a sequence of events. For example, any tasks being performed by electronic component 102 may be aborted; the hot plug controller 108 may turn off power to component port 104; and the electronic component 102 may be removed from operating system 107. The user may confirm any changes via input/output devices generally indicated at 95.

The sensor circuit 112 and other aspects of computer system 100 are just one example of an embodiment configured for sensing resistance no other electrical parameter at two contact points. A variety of other touch-sensitive circuitry is known in the art that may be adapted for use with the present invention.

Embodiments of the invention incorporating a shared contact point favorably give the user the ability to target specific servers and components, without distributing the operation of other servers and components. The user is unlikely to inadvertently uninstall a component, because the user deliberately selects a component for removal by touching both the shared contact point and the contact point uniquely assigned to a particular component. In some embodiments, the spacing between contact points may be selected to further minimize the likelihood of unintentionally touching both contact points simultaneously. Yet another advantage of shared contact point is that the overall number of contact points is less than if each component is provided with its own pair of contacts.

The function of a shared contact point is not limited to specifying a server. Embodiments may incorporate a shared contact point to specify any desired subsystem of electronic components. For example, a circuit designer may assign a shared contact point to each of several sections of chassis or circuit board. Thus, the user working on the desktop PC can specify one of the several sections of the circuit board, without the potential disturbing operation of other sections or their components.

Despite the advantages of using both a shared contact point and a uniquely-associated contact point, this feature is not essential. For example, in some embodiments, two contact points may be assigned to each component port. The user would contact both contact points to signal an intention to remove the associated component. Spacing between contact points may nevertheless be selected to minimize the risk of inadvertently contacting both contact points simultaneously.

Although the touch-activated circuitry in some embodiments is sensitive to changes in electrical resistance at the various contact points, other electronic parameters may be sensed. For example, some embodiments of touch-activated circuitry may be responsive to a change in electrical capacitance or current at the various contact points. The system designer may choose the electronic parameter to be sensed based on the specific environment, application, type of electronic components involved, and so forth.

In some embodiments, small fluctuations in the electronic parameter being sensed may occur without a user touching the contact points. For example, environmental variables such as temperature and humidity could affect the electronic parameter being sensed. To prevent inadvertent activation, some embodiments of touch-activated circuitry may include a predefined set point. In other words, the touch-activated circuitry may be configured such that activation occurs only when the electronic parameter being sensed is within a predefined range of values consistent with the range expected when a user touches a contact point. In embodiments that sense electrical resistance, the selected range may be between about two MegaOhms and about ten MegaOhms.

It is important to understand what is intended by the terms "simultaneously," "at the same time," and as forth, with regard to touching a shared contact point and a contact point uniquely associated with a particular electronic component. The term "simultaneous" does not require that the contact between the two contact points must be initiated at precisely the same instant. Rather, the term "simultaneous" may simply mean that both contact points are being touched simultaneously at some point in time. For instance, the user may activate a circuit by touching a shared contact point and subsequently touching the other contact point prior to removing contact with the shared contact point. This helps ensure that no electronic component is inadvertently uninstalled.

However, in other embodiments, it may be desirable to allow the contact points to be touched in sequence. For example, in large systems, the particular subsystem designated by a shared contact point may be far away from the components of that subsystem. In such instances, it may be difficult for user to simultaneously touch both the shared contact point and a contact point uniquely associated with a particular component of the subsystem. The system may therefore be configured so that after a user has touched a shared contact point momentarily, the contact point remains "on" for a period of time after the user has removed his or her finger. The period of time may be selected by the system designer to allow the user ample time to move to the component to be removed, and to touch the contact point uniquely associated with that particular electronic component.

A system designer may configure the system to perform any desired maintenance and service operations involving the various electronic components. A user may additionally configure the system to perform any desired maintenance and service according to the user's preferences. The actions discussed herein, such as completing/aborting a component task, uninstalling a component from an operating system, and shutting off power to a component port, are just examples that may be particularly useful for hot-swappable electronic components. The system designer or user may select other steps and functions to be performed in response to activating a touch-activated circuit. Specific steps and functions may be chosen based factors including, but not limiting to, the specific environment, application, or type of electronic components involved. Exemplary, functions may be software or hardware related. Software functions include, but are not limited to, installing and uninstalling an electronic component from an operating system, installing or uninstalling driver, and initiating, completing, or aborting a software task. A software task may involve the electronic component to be removed or installed, or may instead govern other aspects of the computer system.

It should be recognized, therefore, that the invention may take the form of an entirely hardware embodiment, an entirely software embodiment, or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optic disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
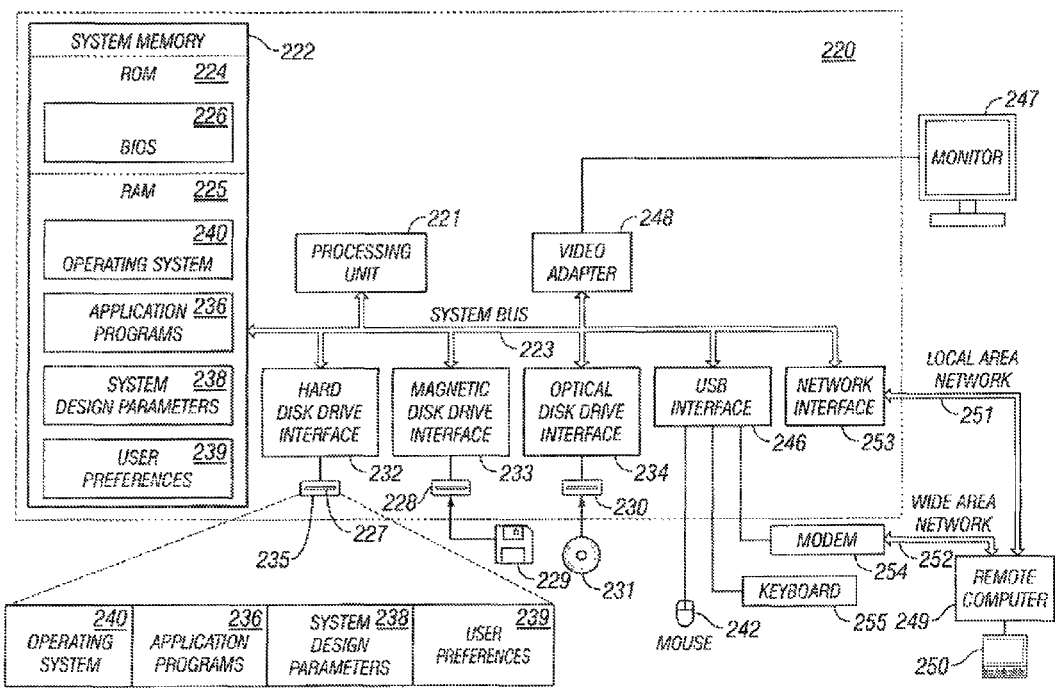
FIG. 5 is a schematic diagram of a computer system that may be configured for performing aspects of maintenance and service according to an embodiment of the invention.

To illustrate, FIG. 5 is a schematic diagram of a computer system 220 that may be configured for performing aspects of maintenance and service according to an embodiment of the invention. The maintenance and service may be performed on the computer system 220, or on another computer system. The computer system 220 may be a general-purpose computing device in the form of a conventional computer system 220. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226, containing the basic routing that help to transfer information between elements within computer system 220, such as during start-up, is stored in ROM 224.

Computer system 220 further includes a hard disk 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computer typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 5. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to a system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A system designer parameter database 238 may be included, which may contain parameters and procedures for performing maintenance and service, as designated by a system designer. A user preferences database 239 may also be included, which may contain parameters and procedures for performing maintenance and service, as designated by an end of the computer system 220. Aspects of the present invention may be implemented in the form of application program 236. Application program 236 may be informed by or otherwise associated with system designer parameter database 238 and/or user preferences database 239. The application program 236 generally comprises computer-executable instruction for performing system maintenance and service, such as controlling power and data flow to electronic components, installing or uninstalling electronic components from the operating system 240, and so forth, of computer system 220 or another computer system.

The described example shown in FIG. 5 does not imply architectural limitations. For example, those skilled in the art will appreciate that methods of performing maintenance and/or service may be implemented in other computer system configurations, including rack systems or blade server system, hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program models may be located in both local and remote memory storage devices.

Figure 6:
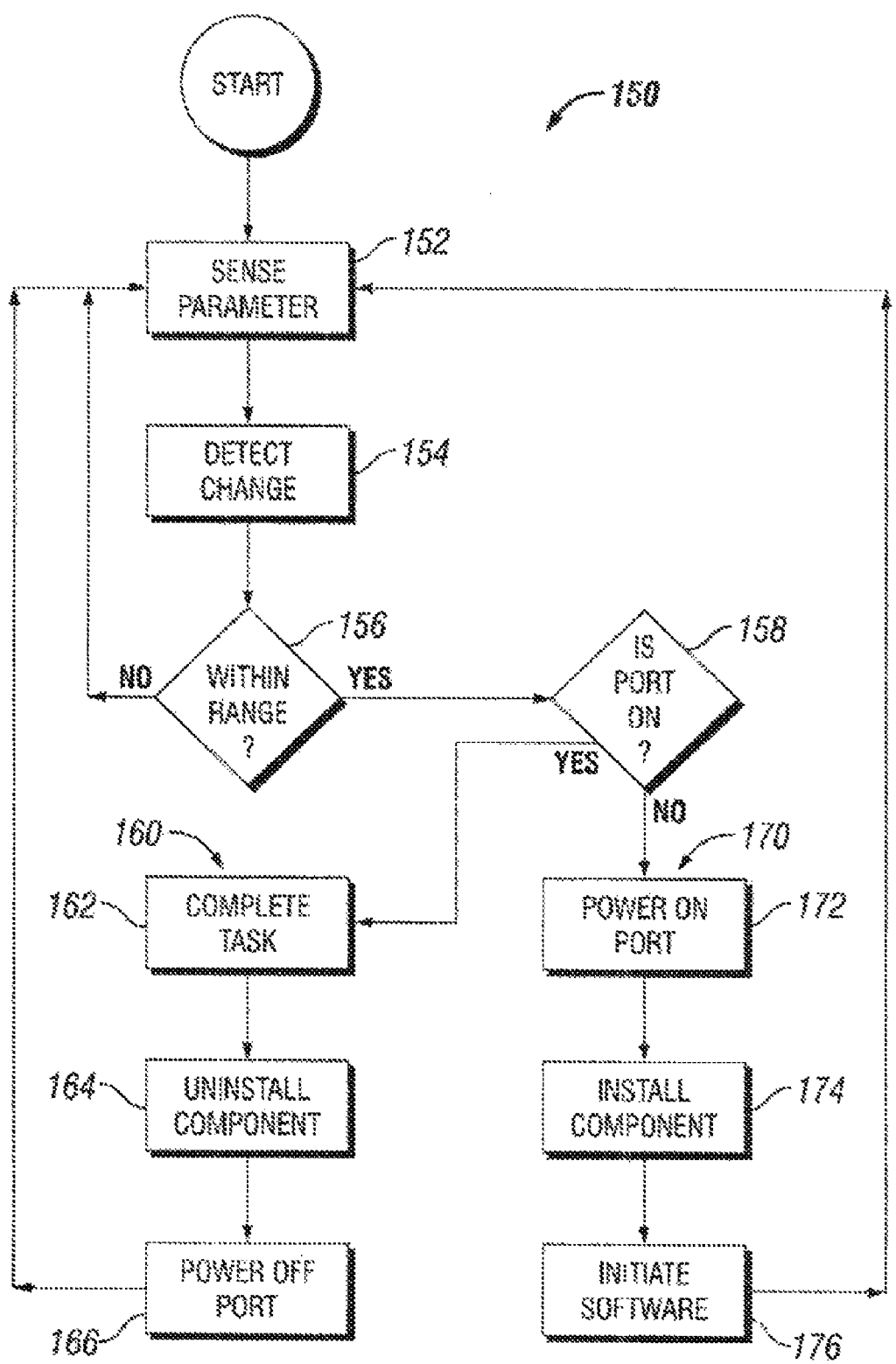
FIG. 6 is a flowchart illustrating a method of serving a computer system.

FIG. 6 is a flowchart illustrating a method of servicing a computer system. This method may be carried out by a system such as the computer system 220 (FIG. 5), or another computer system. According to step 152, the system continuously monitors an electrical parameter, such as electrical resistance. The system notes any changes to the electrical parameter in step 154. In step 256, the system determines whether such changes bring the electrical parameter into a predefined range that is consistent with a user touching a contact point (for example, via a set point). If the change in the electrical parameter is determined to be within the predefined range, this indicated that a user has touched the associated contact point(s). Next, in step 158, the system determines whether the user intends to install or uninstall a component. If the port is already on, the system deduces that the user intends to uninstall the component. In that case, the system would trigger, or prompt the user to confirm an intention to trigger, an uninstall sequence generally indicated at 160. The system would instruct the component to complete any tasks (step 162), then uninstall the component from the operating system (step 164) and then off power to the component port (step 166), so that the user may safely remove the component. Alternatively, if the port is off in step 158, the system deduces that the user intends to install the component. The system would then trigger an install sequence generally indicated at 170. The system would turn on power to the component port (step 172), install the component into the operating system (step 174), and initiate any software functions required to operate the component (step 176).

As illustrated in the above embodiments and examples, systems and methods for performing maintenance and service according to the invention may have numerous advantages. The use of touch-activated circuitry may result in faster, more efficient, less expensive, and more reliable maintenance and/or service. Touch-activated circuitry for controlling power to computer system component ports may obviate the need for mechanical switches, thus reducing mechanical wear and tear. Embodiments of the invention may also automate tasks associated with removing or installing electronic components on a computer system. The use of shared contact points may allow a user to isolate or target specific servers or subsystems without affecting operation of other servers or subsystems. The number of contact points required may also be reduced with the use of shared contact points. Contact points may be judiciously positioned and spaced to further minimize inadvertently activating the touch-activated circuitry. These and more other advantages may result in the various embodiments. However, none of the advantages mentioned are intended to limit the scope of the invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a computer chassis having a plurality of component ports, each component port adapted for removably receiving one of a plurality of electronic components; and
a touch-activated circuit in the computer chassis including a touch-sensitive shared contact point associated with all of the components and a plurality of touch-sensitive component-specific contact points each uniquely associated with a respective one of the components, the touch-activated circuit being configured to sense a change in electrical parameter between the shared contact point and the component-specific contact point associated with any user-selected one of the components caused by a user simultaneously touching the shared contact point and the component-specific contact point, and controlling a power to the user-selected one of the components in response to the change in electrical parameter.

2. The system of claim 1, wherein the touch-activated circuit includes an open circuit condition between each component-specific contact point and the shared contact point when the user is not simultaneously touching the shared contact point and the component-specific contact point.

3. The system of claim 1, wherein the touch-activated circuit is responsive to the change in electrical parameter when the change in electrical parameter results in the electrical parameter between the shared contact point and the component-specific contact point being within a predefined range of values.

4. The system of claim 1, further comprising a plurality of servers, wherein each one of the plurality of contact points is uniquely associated with a particular one of the plurality of servers.

5. The system of claim 1, wherein the chance in electrical parameter sensed by the touch-activated circuit is a change in voltage, resistance, or capacitance between the shared contact point and the component-specific contact point.

6. The system of claim 1, wherein the touch-activated circuit is configured for alternately turning on and off electrical power to the component port in response to the change in electrical parameter caused by a user simultaneously touching the shared contact point and the user-selected component-specific contact point.

7. The system of claim 1, wherein the touch-activated circuit is configured for initiating a software function in response to the user simultaneously touching the shared contact point and the user-selected component-specific contact point.

8. A system, comprising:
a computer chassis having a plurality of component ports, each component port adapted for removably receiving an electronic component;
a touch-activated circuit including a plurality of component-specific contact points, wherein each of the plurality of component-specific contact points is uniquely associated with a respective one of the plurality of component ports; and
a shared contact point, the shared contact point being associated with all of the plurality of component ports, wherein the touch-activated circuit is configured for detecting a change in electrical parameter between the shared contact point and a selected one of the component-specific contact points attributable to a user simultaneously touching the shared contact point and the component-specific contact point associated with the respective one of the plurality of component ports, and thereby controlling the supply of electrical power to the respective one of the plurality of component ports.

9. The system of claim 8, wherein the touch-activated circuit is responsive to the change in electrical parameter when the change in electrical parameter results in the electrical parameter being within a predefined range of values.

10. The system of claim 8, wherein each of the plurality of contact points are on the computer chassis.

11. The system of claim 8, wherein the touch-activated circuit is configured for alternately turning on and off electrical power to the component port associated with the selected one of the component-specific contact points in response to the change in electrical parameter attributable to the user simultaneously touching the shared contact point and the component-specific contact point.

12. The system of claim 8, wherein the touch-activated circuit is configured for initiating a software function in response to detecting the change in electrical parameter.

* * * * *